(12) United States Patent
Kline

(10) Patent No.: US 6,629,354 B1
(45) Date of Patent: Oct. 7, 2003

(54) APPARATUS FOR IMMOBILIZING A FRAME STRUCTURE IN ITS FREE STATE TO ESTABLISH A NET DATUM POSITION THEREOF

(75) Inventor: John Kline, Rochester, MI (US)

(73) Assignee: Utica Enterprises, Inc., Shelby Township, MI (US)

( * ) Notice: Subject to any disclaimer, the term of this patent is extended or adjusted under 35 U.S.C. 154(b) by 119 days.

(21) Appl. No.: 09/711,644

(22) Filed: Nov. 13, 2000

(51) Int. Cl.[7] .............................. B23Q 7/00; B23Q 1/25; B25B 27/14
(52) U.S. Cl. ........................ 29/559; 29/281.1; 29/721; 269/71
(58) Field of Search ................................. 29/559, 281.1, 29/281.4, 281.6, 700, 721, 722, 281.5; 269/71, 74

(56) References Cited

U.S. PATENT DOCUMENTS

| | | | |
|---|---|---|---|
| 4,216,947 A | * | 8/1980 | Chausse ............... 269/71 |
| 4,760,633 A | | 8/1988 | Dacey, Jr. |
| 4,884,431 A | | 12/1989 | Dacey, Jr. |
| 5,987,726 A | | 11/1999 | Akeel |

* cited by examiner

Primary Examiner—John C. Hong
(74) Attorney, Agent, or Firm—VanOphem & VanOphem, P.C.

(57) ABSTRACT

An apparatus for finding and immobilizing a vehicle chassis frame in its free state to form a net datum position in the design-intent position. The chassis frame is positioned between a plurality of opposed pads. The opposed pads are advanced from a retracted position to an advanced position to find the chassis frame. The opposed pads engage the chassis frame such that there is minimal displacement or deformation thereof. Once the opposed pads find their respective reference contact surfaces on the chassis frame, a locking mechanism is provided for locking the pair of opposed pads in place in the advanced position so as to immobilize the chassis frame therebetween. Subsequently, a forming and piercing mechanism may be used to fabricate locating features net to the frame fixture and in design-intent position on the chassis frame.

15 Claims, 4 Drawing Sheets

APPARATUS FOR IMMOBILIZING A FRAME STRUCTURE IN ITS FREE STATE TO ESTABLISH A NET DATUM POSITION THEREOF

BACKGROUND OF THE INVENTION

1. Field of the Invention

The present invention generally relates to a method and apparatus for establishing a net datum position of a framing structure. More specifically, this invention relates to a method and apparatus that finds reference surfaces of an automotive vehicle frame that has been assembled within an acceptable tolerance range, and despite the within-tolerance variation of the reference surfaces on the frame, the frame is immobilized in its free state so that work can be subsequently performed on the frame to fabricate a net datum locating feature in its original design-intent location on the frame.

2. Description of the Related Art

In the manufacturing of automobiles and trucks, a chassis frame typically includes an underbody, a pair of side frames, and front and rear headers wherein such chassis frame usually undergoes a progressive series of positioning and welding steps before a rigid chassis frame is produced. Though vehicle bodies are still manually assembled and welded, emphasis on automated assembly and welding operations has generated numerous automated and semi-automated framing systems.

Generally, in such prior art processes it is a common object of a framing system to accurately locate the body components relative to each other and maintain such location throughout later welding operations, until the structural rigidity of the body is sufficient to preserve the desired geometric configuration throughout the assembly line. A further object for most framing systems is to provide sufficient flexibility to accommodate more than one body style, so as to enhance the versatility of the assembly line and reduce the tooling cost per assembly unit.

Chassis frames, however, have not received as much attention as vehicle bodies with respect to automated assembly techniques and accordingly, are currently still being assembled on fixtures built to design-intent, wherein a pair of rail members are clamped in place with a series of cross members therebetween and subsequently welded together to permanently fasten the rails and cross members.

Unfortunately, the heat generated from welding operations causes the chassis frame to warp or twist out of its design-intent geometry and position. Such warping is problematic because the individual components of the chassis frame include locating surfaces or holes that are relied upon for locating other features produced in subsequent operations. Unfortunately, due to warpage of the chassis frame from the welding operation, such locating surfaces or holes are intolerably displaced from their design-intent position, and thereby negatively effect the location of the other features produced during subsequent operations.

There are at least two well-known attempts to solve this problem. First, many manufacturers use a frame straightening process in an attempt to correct the warping. The frame straightening process, however, tends to be an exercise in futility since the process introduces additional built-in stress to the chassis frame and can lead to further displacement of the rails and cross member structure. Such frame straightening processes are rarely, if ever, capable of reliably straightening the entire chassis frame back into its exact design-intent geometry.

A second solution involves welding the components of the chassis frame together, then forcibly clamping the chassis frame from its free state back into its exact design-intent geometry, then producing holes and other features, and finally unclamping the chassis frame. This solution is performed with the expectation that the holes and other features will remain positioned within a certain tolerance relative to the design-intent geometry of the chassis frame when the part is unclamped. Unfortunately, however, the chassis frame tends to spring back to its warped free state when unclamped and thus, the holes and other features of the chassis frame are carried away from their design-intent position, in some cases out of the acceptable tolerance range.

In addition to the above-mentioned general approaches, several other locating or positioning devices associated with processing vehicle chassis frames have been proposed in the prior art. For example, U.S. Pat. No. 4,976,026 to Dacey, Jr. addresses the problems associated with locating a datum reference on a partially assembled structural object such as an automobile chassis frame. As a solution, Dacey, Jr. teaches an apparatus having a probe portion thereof for detecting pre-established surfaces and features on the vehicle body to establish a datum position. Tooling attached to the apparatus subsequently references the datum position established by the probe portion, and performs work on the vehicle body in relation thereto.

Dacey, Jr. discloses the apparatus as having a base rigidly mounted to a floor, and having a transfer platform attached to the base with guideposts to ensure freedom of movement of the transfer platform in a first horizontal direction toward the vehicle body. A support platform is attached to the transfer platform using guideposts to ensure freedom of movement relative thereto in a second horizontal direction that is perpendicular to the first horizontal direction. A vertical platform is attached to the support structure and is moveable therewith along guideposts in a vertical direction. A form and pierce device is attached to a lower portion of the vertical platform for performing work on the vehicle body. A pair of hydraulic work supports interpose each of the platforms, at clamping plate locations, for locking horizontal and vertical movement of the apparatus. A series of probes are attached to an upper end of the vertical platform for detecting the pre-established surfaces and features of the vehicle body from which the datum position is established. For example, one of the probes includes a tapered surface to permit the probe to climb vertically onto a fender rail, and another probe is tapered to guide it into a preformed orifice in the vehicle body. Once the probes locate the pre-established surfaces and features of the vehicle body, fluid pressure is introduced to the work supports so that push rods of the work supports exert an equal clamping force on either side of the positioning plates for locking the transfer, support, and vertical platforms in place. The datum position of the pre-established surfaces and features is thereby established to permit the form and pierce tool to perform work upon the chassis frame in relation to the datum position.

As discussed above, Dacey, Jr. provides an apparatus having a sub-assembly for forming and piercing a vehicle body panel or sub-frame in direct relation to a datum position established by detecting pre-established surfaces and features of the vehicle body by another sub-assembly of the same apparatus. Unfortunately, however, Dacey, Jr. requires that a preformed orifice and specific body panels be located on the vehicle body prior to immobilizing the tooling device for subsequent forming and/or piercing operations.

Additionally, Dacey, Jr. does not teach or disclose that the apparatus is capable of rigidly immobilizing the entire vehicle body by itself, not just proximate the datum location, thereby enabling work to be performed anywhere on the vehicle body. Finally, the piercing operation disclosed in Dacey, Jr. is performed by a tooling device, relative to a datum location established by probing various predefined features that have pre-existing tolerance variation. The positions of the various predefined features on the vehicle body, such as the top of the fender rail and the preformed orifice, have size and locational tolerance variations. Further, the apparatus including the probes, platforms, and piercing tooling have size and locational tolerance variations also. Therefore, the piercing operation is performed relative to specific features of the vehicle body that have tolerance variation, rather than performed directly relative to a net datum position of the entire vehicle body frame.

U.S. Pat. No. 5,987,726 to Akeel identifies a general problem with assembling body panels, wherein internal stresses are built into body assemblies. Therefore, Akeel teaches the use of programmable body panel positioners for compliant positioning of body panels or tooling during assembly operations to achieve a stress-free vehicle body assembly. Akeel discloses a parallel link mechanism having a base plate, a locator plate spaced above the base plate, and three pairs of linear actuator links attached between the base and locator plates by universal joints. Either a tool or a body panel member is clamped to the locator plate for processing the body panel member. The actuators are screw drives for changing the length of each link in a corrective manner in response to variation in processing forces. A feedback control system, including force sensors and encoders, is communicated with the links so that the actuators react to processing forces for increasing the holding force on the body panel member for higher support rigidity, or to decrease the holding force for controlled compliance and a stress free assembly.

Unfortunately, Akeel involves use of very complex apparatus used to avoid building stresses into the body assembly. Additionally, clamping forces are nonetheless imparted to the body panels, albeit in an adjustable manner.

From the above, it can be appreciated that the general solutions of the prior art relative to frame warpage and out of position holes and features are not fully optimized, and no specific viable solutions have been identified in the prior art. Therefore, what is needed is a simple apparatus and method for finding a chassis frame despite within-tolerance variation in size, position, or geometry of the chassis frame, and immobilizing the chassis frame in its free state without imparting forces sufficient to displace the chassis frame, whereby a net datum position of the chassis frame is established so that net datum locating features can be subsequently produced in precise design-intent locations on the frame.

BRIEF SUMMARY OF THE INVENTION

According to the present invention, there is provided an apparatus and method for finding and immobilizing a workpiece in its free state, within an acceptable tolerance range, to establish a net datum position of the workpiece without compressingly clamping any portion of the workpiece so as to avoid deforming or displacing the workpiece to avoid building stress into the workpiece or incurring springback of the workpiece. The apparatus includes a pair of opposed pads for "finding" the workpiece by independently coming into contact with opposite reference surfaces of the workpiece. An advancing device, such as a work support, connects to each of the opposed pads for advancing the opposed pads from a retracted position to find an advanced position in contact with the opposite portions of the workpiece. The advancing device advances the pair of opposed pads into contact with the workpiece, regardless of the exact location of the reference surfaces on the workpiece, without measurably displacing the workpiece. A locking mechanism is provided for locking the pair of opposed pads in their advanced position, whereby the pair of opposed pads lock in place without imparting any force on the workpiece, so as to immobilize the workpiece therebetween so that a net datum position is established for the workpiece.

It is an object of the present invention to provide an apparatus and method that is capable of immobilizing a chassis frame or carriage and establishing a net datum position of such carriage for subsequent processing.

It is still another object to provide an apparatus and method that is adapted to immobilize a chassis frame or carriage in its free state as it rests upon a chassis frame fixture.

It is yet another object to provide an apparatus and method for finding the position of a chassis frame and immobilizing the chassis frame in its free state as it rests upon a fixture, that can be used in conjunction with a tool such as a form and pierce device, to produce features in precise locations on the chassis frame that are net to the fixture, and thus to design-intent, despite tolerance variations within preselected acceptable limits in size or location of the chassis frame.

It is a further object to provide an apparatus and method that finds the position of and immobilizes a chassis frame in its free state without imposing on the chassis frame external forces sufficient to measurably deform or displace the chassis frame from its free state, in order to establish a net datum position according to design-intent so that this net datum position can be used as a reference to perform subsequent work on the chassis frame after engagement of the apparatus.

It is yet a further object to provide an apparatus and method for finding and immobilizing a chassis frame in its free state at a series of different workstations to perform work on the chassis frame so as to establish a net datum position or location and use the net datum position throughout using common fixtures, to perform subsequent work on the chassis frame without subjecting the chassis frame to clamping forces that not only deform and distort the chassis frame, but that also vary from workstation to workstation. Thus, the different tools produce different features in precise locations on the chassis frame that are net to the common fixtures, and thus to design-intent, despite tolerance variations in size or location of the chassis frame, and that are not influenced by varying clamping forces.

These objects and other features, aspects, and advantages of this invention will be more apparent after a reading of the following detailed description, appended claims, and accompanying drawings.

DETAILED DESCRIPTION OF THE PREFERRED EMBODIMENT

Figure 1:
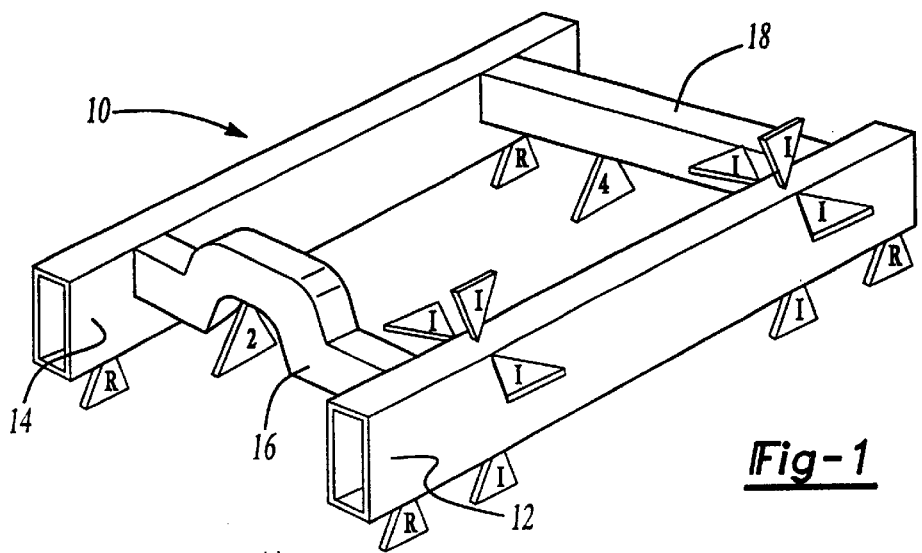
FIG. 1 is a perspective view of a schematic of a chassis frame or carriage in a workstation.

Referring now in detail to the FIGS., FIG. 1 schematically illustrates a perspective view of a workpiece or chassis frame 10. The chassis frame 10 is shown positioned, symbolically, within a workstation according to an apparatus and method of the present invention. As illustrated in FIG. 1, the chassis frame 10 is a welded structure composed of a right and left rail 12 and 14, and front and rear cross-members 16 and 18 welded therebetween. The chassis frame 10 is shown resting upon a chassis frame fixture symbolized by four rest buttons R, a two-way pin 2, and a four-way pin 4, as is commonly known in the art. As is well known, the pins 2 and 4 necessitate use of corresponding holes or slots in each of the cross-members 16 and 18, for cooperation therewith. One skilled in the art will recognize that alternative fixturing arrangements could be substituted for that described herein without affecting the novelty of the present invention. The rest buttons R and pins 2 and 4 serve to establish the chassis frame 10 in position freely upon the fixture.

As is also well known in the art, the chassis frame 10 may enter the workstation using any of a number of material handling systems including an automatically guided vehicle (AGV), a dedicated sled, or preferably an overhead gantry. Therefore, identical individual chassis frame fixtures composed of rest buttons R and pins 2 and 4 can be positioned at each of several separate workstations along an assembly line, such as is used with an overhead gantry. Alternatively, one chassis frame fixture can be positioned on a sled or AGV such that the exact same rest buttons R and pins 2 and 4 are used from workstation to workstation, for any given chassis frame 10.

In the workstation, the chassis frame 10 is positioned on the rest buttons R and pins 2 and 4 of the chassis frame fixture in its free state, in other words, its unstressed or relaxed condition. Since the chassis frame 10 is a welded construction, its free state is usually a slightly warped or twisted condition due to the heat effects of preceding welding operations. Typically, however, any given point of the chassis frame 10 is tolerated to be out of dimension within a certain acceptable limit, for example plus or minus 8 mm along any axis, from a nominal design-intent size or position and with respect to the chassis frame fixture.

The chassis frame 10 is immobilized in two planes by four pairs of immobilizing devices I. As will be discussed in structural detail below, this is accomplished by activating the immobilizing devices I and allowing plungers or push rods to float in towards the chassis frame 10 under very low pressure so as to come into contact with the chassis frame 10 to locate, or "find", the chassis frame 10 in its free state position. Each of the immobilizing devices I is actuated accordingly, and function so as to find reference surfaces on the chassis frame 10. During this finding phase, the immobilizing devices I come into contact with the chassis frame 10 at the various reference surfaces and produce a slight force, approximately 8 psi of effort, on the frame so as to firmly establish contact with the various portions of the chassis frame 10. Upon all of the immobilizing devices I establishing contact and finding the chassis frame 10, each immobilizing device I locks up under hydraulic force sufficient to render the chassis frame 10 immovable from its free state so that work can be performed on the chassis frame 10 in the form of establishing net datum locating features on the chassis frame 10. The net datum locating features to be established may be similar to that as taught in commonly owned U.S. Pat. No. 4,760,633 to Dacey et al. or any other convenient net locating scheme.

Alternatively, the chassis frame 10 could be located in three planes, or only one plane if desired, by using immobilizing devices I specifically located to accomplish the desired result. As such, the immobilizing devices I of the present invention may be configured in any manner to accommodate any material handling system for the chassis frame 10, and are not limited to the exact configurations disclosed herein.

Therefore, as long as the chassis frame 10 is within the acceptable tolerance variation limit, it is preferable to find or locate the chassis frame 10 wherever it is in its free state rather than forcibly clamp the chassis frame 10 back toward its nominal or design-intent position. In this manner, the chassis frame 10 is not distorted or displaced by the immobilizing devices I, as would be the case using a prior art clamping method. According to the present invention, the immobilizing devices I simply find and then confine, restrict, or restrain the chassis frame 10 from moving from its free state, such that the chassis frame 10 is immobilized in its free state during operations that are performed thereupon, such as forming, drilling, or fastening operations. In this way, formed pads, holes, fasteners, and other features are fabricated in net datum positions on the chassis frame 10, at their design-intent location, with respect to the position of the chassis frame 10 that is established by the rest buttons R and pins 2 and 4. More importantly, these formed pads, holes, fasteners, and other features remain at design-intent location even after the chassis frame 10 is released from the immobilizing devices I since the force of the immobilizing devices I is equalized from both sides of the chassis frame and cancels itself out so that no external load is applied to the frame in its free state location. The present invention is not limited to only the above-mentioned operations on vehicle chassis frames, but is also applicable to any other carriage or frame structure. The immobilizing devices I will now be described in structural detail below.

Figure 2:
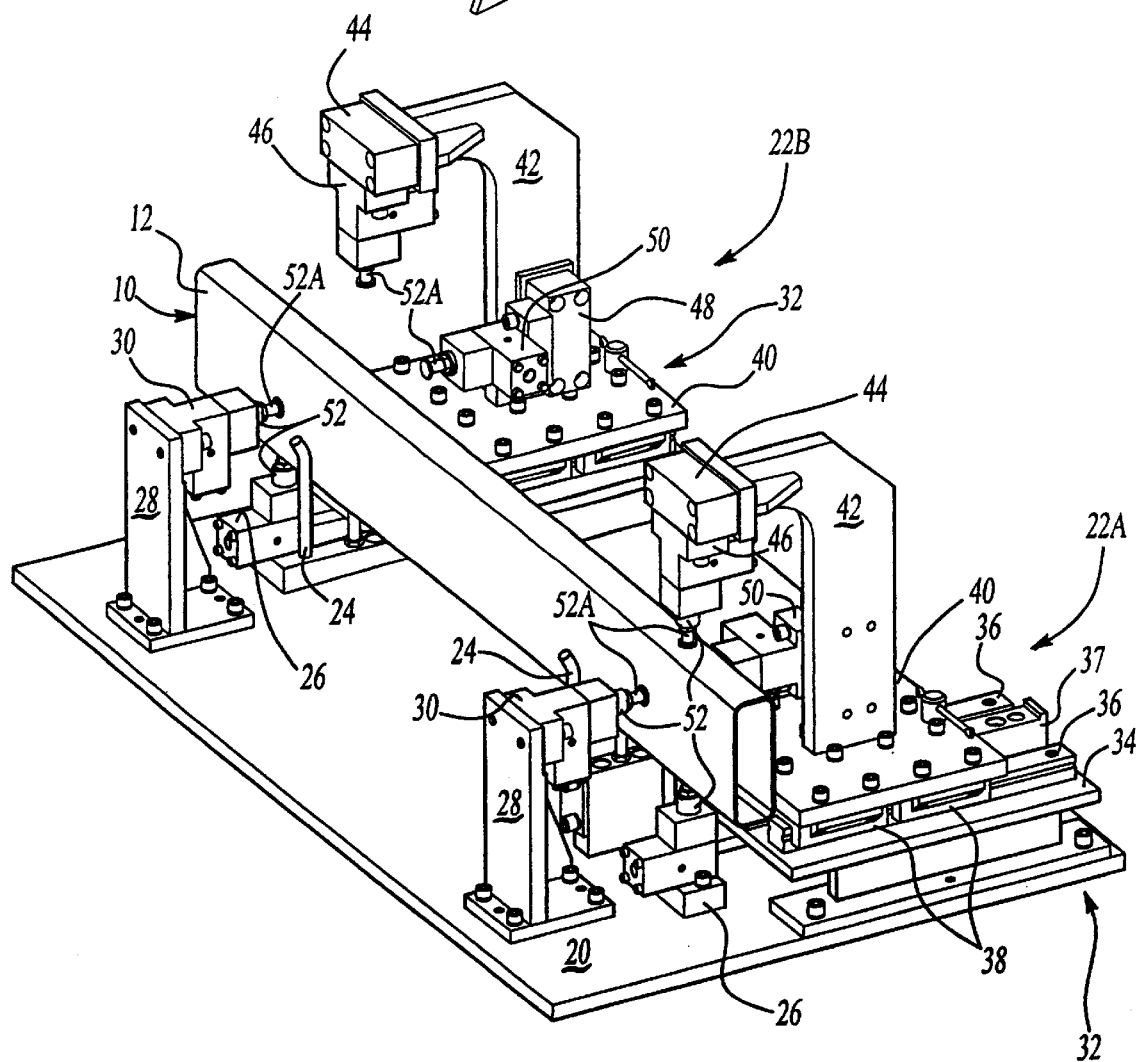
FIG. 2 is a perspective view of a portion of one rail of a chassis frame that is located within an acceptable tolerance range, and is found by an immobilizer apparatus according to a preferred embodiment of the present invention.
Figure 3:
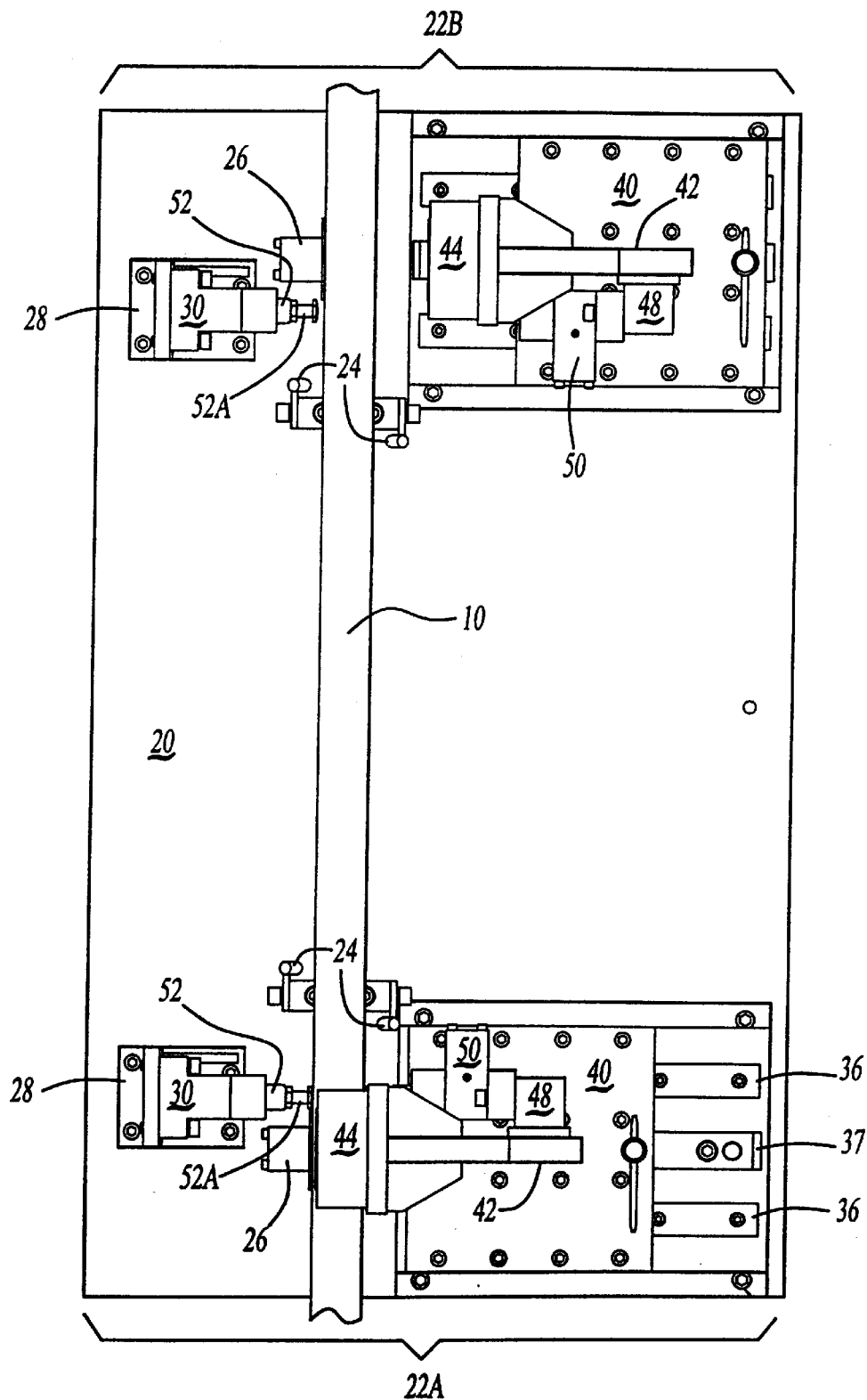
FIG. 3 is a plan view of the portion of the chassis frame and the locator and immobilizer apparatus shown in FIG. 2.
Figure 4:
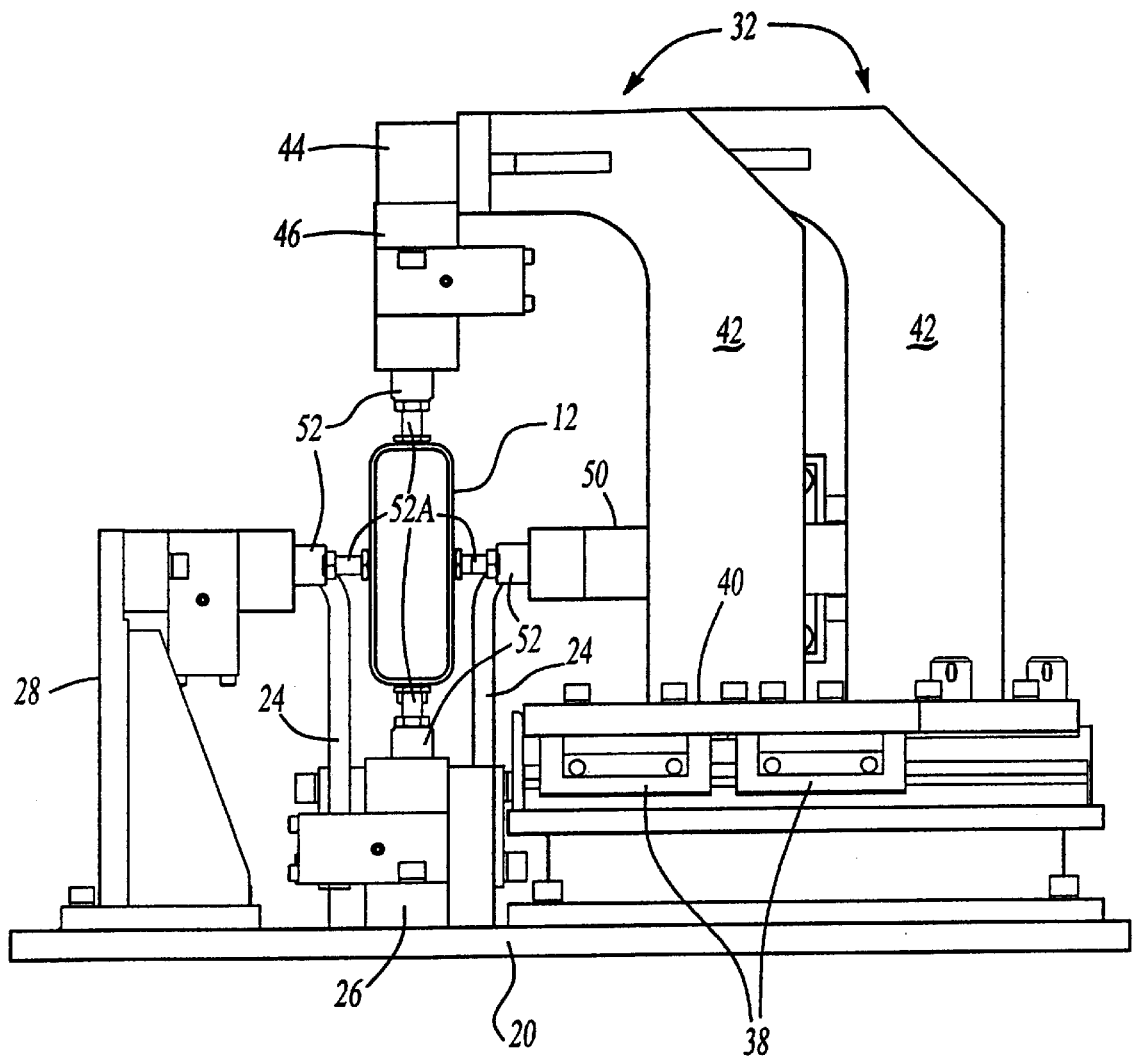
FIG. 4 is a side view of the portion of the chassis frame and locator and immobilizer apparatus shown in FIG. 2.

FIGS. 2 through 4 specifically illustrate the preferred embodiment of the present invention, showing front and rear dual-axis immobilizing devices 22A and 22B that are represented by the symbols I in FIG. 1. As shown in FIG. 2, the front and rear dual-axis immobilizing devices 22A and 22B are mounted to a floor or a workstation platen 20 within a workstation of an assembly line. A portion of the right-hand rail 12 of the chassis frame 10 spans the front and rear dual-axis immobilizing devices 22A and 22B. The rear dual-axis immobilizing device 22B is shown in a completely retracted or home position, whereas the front dual-axis immobilizing device 22A is shown in a completely advanced or work position in contact with the chassis frame 10. Pairs of guide posts 24 are mounted to the workstation platen 20, that are used to prevent the chassis frame 10 from crashing into the immobilizing devices 22A and 22B upon being loaded thereto, and establish outer tolerance limits of an acceptable chassis frame 10. One skilled in the art of manufacturing chassis frames will readily recognize that the chassis frame 10 may be lowered to its position as shown when the immobilizing devices 22A and 22B and associated components are fully retracted out of the way. The chassis frame 10 is preferably lowered into position by an overhead gantry (not shown), but may also be lowered using a lift deck on an AGV (not shown), as is well known in the art.

With regard to each of the front and rear dual-axis immobilizing devices 22A and 22B, there is shown a hydraulic unit, or lower work support 26, bolted to the workstation platen 20, directly underneath the chassis frame 10. Positioned just inboard of the right-hand rail 12 of the chassis frame 10, is an inboard stanchion or support 28 bolted to the workstation platen 20. In turn, an inboard work support 30 is bolted to the top of the inboard stanchion 28. Opposite the inboard work support 30, a transfer assembly 32 is shown bolted to the workstation platen 20. The transfer assembly 32 includes a riser plate 34 bolted to the workstation platen 20 and supporting a pair of guide rails 36 bolted thereto. In turn, the guide rails 36 support pillow blocks 38 bolted to the bottom of a transfer plate 40. The transfer plate 40 supports a transfer stanchion or support 42 extending upwardly therefrom, the transfer stanchion 42 supports an upper mounting block 44 that is bolted thereto, and the upper mounting block 44 supports an upper work support 46 with a bolted arrangement, directly opposite the lower work support 26. The upper work support 46 is aligned with respect to the lower work support 26 such that the operational axes of the work supports 26 and 46 are coaxial. Similarly, the transfer stanchion 42 supports an outboard mounting block 48 that is bolted to the side thereof and that has an outboard work support 50 bolted thereto. The outboard work support 50 is aligned with respect to the inboard work support 30 such that the operational axes of the outboard and inboard work supports 50 and 30 are coaxial.

Each of the work supports 26, 30, 46, and 50 is a standard work support unit including pneumatic advance, hydraulic lock, and spring return functions. Preferably, the work support is a Hytec model number 100847 available from SPX Corporation. Such work supports are typically proposed for hydraulic clamping applications with precisely controlled high clamping forces. Nevertheless, each support 26, 30, 46, and 50 includes a plunger 52 or piston rod displaceably mounted therein that terminates in a pad 52A. Each plunger 52 is normally biased to a home or retracted position by a spring (not shown) within its respective work support. As will later be described in greater detail, each plunger 52 individually advances under pneumatic pressure necessary only to overcome the retracting bias force of its spring and to overcome friction to extend the plunger 52 to an advanced position against the chassis frame 10 in the process of finding the reference surfaces on the chassis frame 10. Pneumatic pressure can be precisely adjusted and controlled to vary plunger contact force with the chassis frame 10, and should be balanced between opposed plungers 52 so that a zero net force is applied to the chassis frame 10. It is important to note that the plunger force of the present invention is not to be confused with clamping forces typically employed with prior art clamping arrangements. The plunger force is only that which is necessary to make contact with the chassis frame, and is not at all sufficient to reposition, or displace the chassis frame, as with prior art clamping arrangements.

Upon finding the reference surfaces on the chassis frame 10, the plungers 52 are locked in place using hydraulic pressure to immobilize the plungers by contracting a sleeve or collet (not shown) within their respective work support that circumscribes each plunger 52 and lockingly grips each plunger 52 in its advanced position. Once the plungers 52 are locked in place they remain rigid and limit elastic deflection. The work supports 26, 30, 46, and 50 are supplied and controlled with hydraulic and pneumatic fluid systems as is very well known in the art, and exemplified by the 1998 SPX Hytec catalog. It is considered to be well within the knowledge of one of ordinary skill in the art to select and apply any of a multitude of such fluid power and control systems and variations thereof to communicate and operate the work supports, as specified herein.

In accordance with the present invention, the preferred operation and method first involves loading the chassis frame 10 to the dual-axis immobilizing devices 22A and 22B by an overhead gantry (not shown). As illustrated by the rear dual-axis immobilizing device 22B in FIG. 2, the transfer assembly 32 and work supports 26, 30, 46, and 50 must be fully retracted to their home positions, to provide clearance for the chassis frame 10 to enter the workstation. The chassis frame 10 is loaded to the front and rear dual-axis immobilizing devices 22A and 22B such that it rests on a chassis frame fixture having pins and rest buttons, not shown here, but as described previously with respect to FIG. 1. Still referring to FIG. 2, the guide posts 24 mounted to the workstation platen 20 help guide the chassis frame 10 into the correct position with respect to the front and rear dual-axis immobilizing devices 22A and 22B and thereby help avoid collision of the chassis frame 10 with the work supports 26, 30, 46, and 50.

Once the chassis frame 10 is loaded to the front and rear dual-axis immobilizing devices 22A and 22B, each transfer assembly 32 of each of the front and rear dual-axis immobilizing devices 22A and 22B advances from its home or retracted position, as shown by the rear dual-axis immobilizing device 22B, to its advanced position, as shown by the front dual-axis immobilizing device 22A. For illustrative purposes, only the front dual-axis immobilizing device 22A is shown in its advanced position. Each transfer assembly 32 is preferably advanced using a hydraulic cylinder (not shown) that advances the transfer plate 40 toward the chassis frame 10 to a positive stop, and each transfer assembly 32 is retracted by the hydraulic cylinder by pulling the transfer plate 40 back to another positive stop. The positive stops are integrated into a positive stop detail 37, as is well known in the art. Alternatively, a ball screw device (not shown) could be used to advance and retract the transfer assemblies 32. Such advancing and retracting devices and applications thereof are well known to persons of ordinary skill in the art. Also well known in the art are pneumatic and hydraulic systems for actuating the work supports 26, 30, 46, and 50 of the present invention. Such systems include computer controls, power sources, control valves, and fluid and electrical circuits that connect to the work supports and that are all well within the realm of knowledge of one skilled in the art.

Once each transfer assembly 32 is advanced to an advanced position, each plunger 52 is then individually pneumatically advanced from a retracted position in order to find respective opposite portions of the chassis frame 10 wherever it may be located within its tolerance range and thereby establish an advanced position for each plunger 52, as best shown in FIG. 4. Referring again to FIG. 2, and as mentioned above, the work supports 26, 30, 46, and 50 are oriented such that the plungers 52 are coaxially aligned in opposed orientation. Each plunger 52 continues to advance individually until the respective pad 52A finds the surface of the chassis frame. Upon finding the chassis frame 10, the plungers 52 cease any further advancement so as not to deflect or displace the chassis frame 10.

Preferably, the pneumatic pressure advance of the plungers 52 is set to a predetermined minimal value to prevent deflection or displacement of the chassis frame 10. The pneumatic pressure is selected so that it is only slightly greater than that required to overcome static friction and the spring force associated with each plunger 52, in order to displace each plunger 52 from its retracted position with the work support 26, 30, 46, or 50 toward the chassis frame 10. In any case, since the plungers 52 are in opposed orientation, the plunger forces are cancelled out to a net effective zero force imparted to the chassis frame. Preferably, however, the preset pneumatic pressure must be determined through experimentation, by choosing a pressure setting that does not yield any deflection or displacement of the chassis frame 10 upon contact of the plunger 52 with the chassis frame 10. With regard to a test model, the pneumatic pressure was set to a value less than approximately 8 psi. It is reasonable to expect, however, that other predetermined minimum values will need to be experimentally determined on a case-by-case basis for different workpieces used in different workstations. In summary, each plunger 52 finds respective opposing portions of the chassis frame 10 without measurably displacing the chassis frame 10, despite where the chassis frame 10 is relative to its design-intent position within a specified tolerance band.

After each plunger 52 has found the chassis frame 10 and is in contact therewith, the sleeves (not shown) within the work supports 26, 30, 46, and 50 hydraulically lock the plungers 52 in place in their advanced position, and the pneumatic pressure is relieved. As such, the work supports 26, 30, 46, and 50 do not hydraulically advance the plunger. Rather, the work supports 26, 30, 46, and 50, via the sleeves therein, constrain the plungers 52 from any axial movement. Likewise, the plungers 52 do not impart any force along their respective axes to the chassis frame 10. In this way, the chassis frame 10 is passively immobilized, trapped, constrained, restricted, or restrained by the plungers 52 so that there is no gap or slack between the plungers 52 and the surface of the chassis frame 10. In contrast, the chassis frame 10 is not forcibly or actively clamped, clenched, or gripped by the plungers 52.

Once the chassis frame 10 is immobilized as described above, desired manufacturing operations, such as forming, piercing, or fastening, are then performed upon the chassis frame 10 to produce net datum features as more fully described in U.S. Pat. No. 4,760,633 to Dacey, Jr., owned by the common assignee hereof and incorporated herein by reference. The desired features are produced in the chassis frame 10 in its free state and located net with respect to the rest buttons and pins of its chassis frame fixture. In other words, in the absence of any clamping forces upon the chassis frame 10, the desired features are manufactured net to the chassis frame fixture, and thereby net to design-intent and the theoretical centerline of the chassis frame 10. Accordingly, the desired features will remain in position, as manufactured, with respect to the theoretical centerline of the chassis frame 10, from workstation to workstation, without being deflected or displaced by the work immobilizing apparatus. Alternatively, a piercing apparatus similar to that disclosed in the '026 Dacey, Jr. device, as described in above, can be used in addition to the present invention in order to pierce a hole relative to a specific net datum feature on the chassis frame 10.

When such manufacturing operations have been completed, the work supports, and hence the plungers 52, are unlocked by releasing the hydraulic pressure applied thereto. The plungers 52 then automatically retract from their advanced positions to their retracted positions by virtue of the return spring force acting upon the plungers 52. The transfer assemblies 32 are also retracted so that the chassis frame 10 can be lifted out of the workstation.

Figure 5:
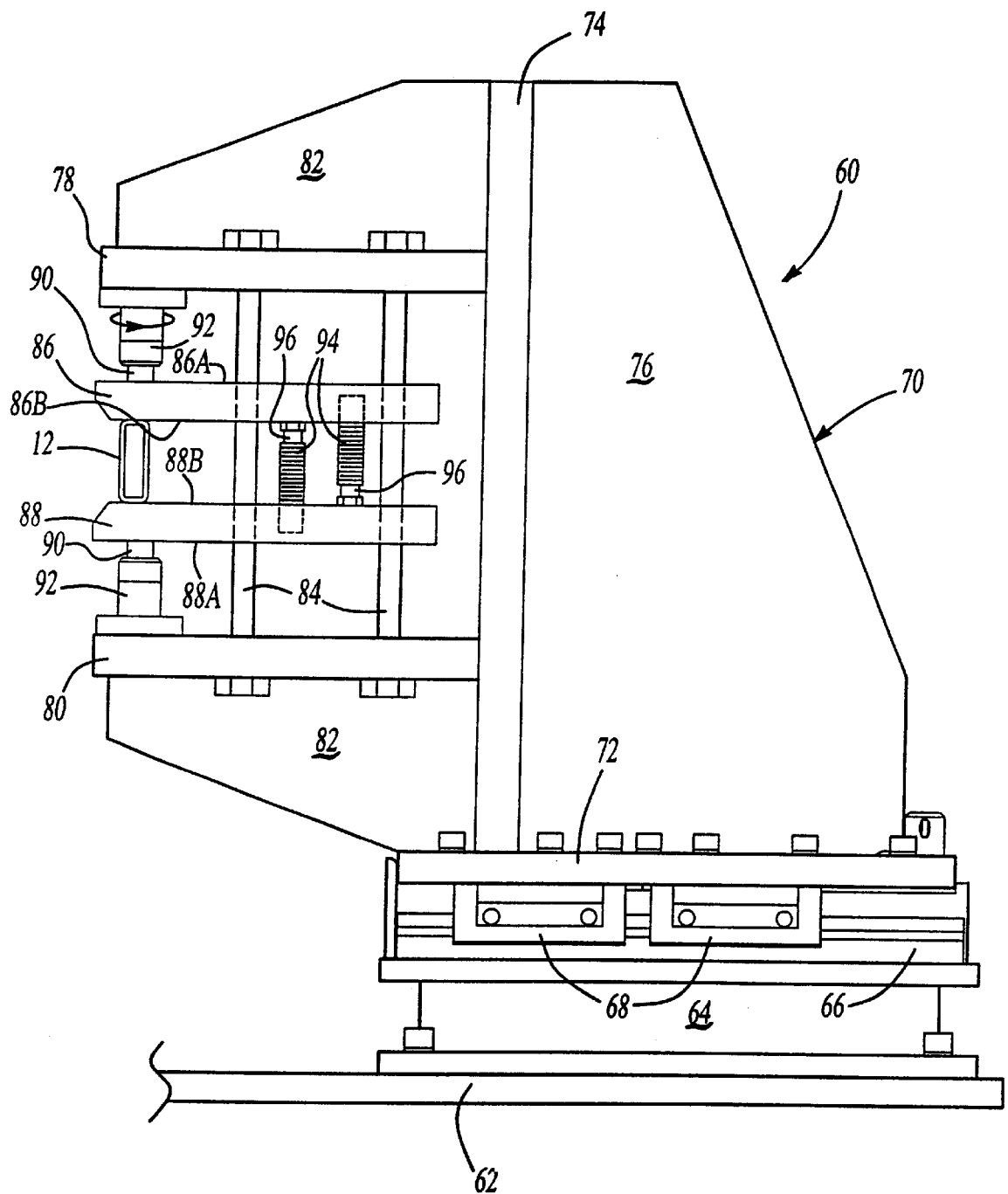
FIG. 5 is a side view of the chassis frame and a locator and immobilizer apparatus according to an alternative embodiment of the present invention.

FIG. 5 illustrates an alternative embodiment of the present invention wherein a single-axis immobilizing device 60 is mounted atop a workstation platen 62. It is contemplated that several such single axis immobilizing devices 60 can be used and oriented horizontally or otherwise with respect to any axis of the chassis frame 10, instead of vertically as shown. The single-axis immobilizing device 60 includes a riser block 64 bolted to the workstation platen 62 that supports a pair of guide rails 66 bolted thereto. In turn, the guide rails 66 support pillow blocks 68 bolted to the bottom of a tombstone weldment 70.

The tombstone weldment 70 includes a base 72, a vertical platen 74, and a gusset 76 welded therebetween. The vertical platen 74 supports an upper platen 78 and an opposed lower platen 80 spaced a distance apart from and substantially parallel to the upper platen 78. The upper and lower platens 78 and 80 extend horizontally outwardly from the vertical platen 74 and are welded thereto, using gussets 82 for support. Guide bars 84 extend between, and are fastened to, the fixed upper and lower platens 78 and 80. Upper and lower bars or pads 86 and 88 are mounted loosely about the guide bars 84 between the upper and lower platens 78 and 80. The upper pad 86 is spaced parallel with respect to the lower pad 88 a predetermined distance above the lower pad 88. The upper and lower pads 86 and 88 are moveably mounted about the guide bars 84 such that they are displaceable between a home or retracted position, and an advanced position as shown.

Work supports 92 are fixed to the upper and lower platens 78 and 80 respectively such that plungers 90 of the work supports contact locking surfaces 86A and 88A of the upper and lower pads 86 and 88. Similarly, a pair of opposed threaded body cylinders 94 are disposed between the upper and lower pads 86 and 88 such that they are oppositely fastened, one into the upper pad 86 and one into the lower pad 88, and have plungers 96 that find workpiece contact surfaces 86B and 88B of the respective opposite upper and lower pads 86 and 88. Preferably, the work supports 92 are a Hytec model 100998 spring advance type, and the threaded body cylinders 94 are a Hytec model 11AA spring return type, or equivalent.

In accordance with the alternative embodiment of the present invention, the associated operation and method involves loading the chassis frame 10 to the single-axis immobilizing device 60 via an AGV (not shown). Accordingly, the immobilizing device 60 must be fully retracted to a home position, to provide clearance for the chassis frame 10 to enter the workstation. Additionally, the threaded body cylinders 94 are in their fully extended position. The chassis frame 10 is loaded to the workstation such that it rests on an AGV chassis frame fixture having pins and rest buttons, as described above.

Once the chassis frame 10 is loaded to the workstations, the immobilizing device 60 advances from its home position to its advanced position, as described above in the preferred embodiment. Accordingly, the upper and lower pads 86 and 88 respectively extend over and under the chassis frame 10 such that the chassis frame 10 is in position therebetween. The distance between the upper and lower pads 86 and 88 in the extended position is such that each pad 86 and 88 is nominally spaced from the respective surface of the chassis frame 10. The spacing is equal to the chassis frame 10 positional tolerance, for example 8 mm as stated previously, from a nominally sized and positioned chassis frame 10. Due to the spring advance, each of the work supports 92 is in constant contact with its respective upper and lower pad 86 and 88. Pressure is then slowly relieved from each of the threaded body cylinders 94, until the spring force of the work supports 92 advances the plungers 90, and thereby the upper and lower pads 86 and 88 into contact with the chassis frame 10 in order to find respective opposite portions of the chassis frame 10 and thereby establish an advanced position for each upper and lower pad 86 and 88. As with the pneumatic pressure described in the preferred embodiment, the spring force of the work supports 92 is selected such that the spring force is sufficient to displace the pads 86 and 88 but is insufficient to deflect or displace the chassis frame 10 upon contact therewith. In other words, upon finding the chassis frame 10, the upper and lower pads 86 and 88 cease any further advancement so as not to deflect or displace the chassis frame 10. In summary, each pad 86 and 88 finds respective opposite portions of the chassis frame 10 without measurably displacing the chassis frame 10 despite where the chassis frame 10 is relative to the chassis frame fixture, within acceptable tolerance limits.

Once the upper and lower pads 86 and 88 have found the chassis frame 10 and are in contact therewith, sleeves (not shown) within the work supports 92 hydraulically lock the plungers 90 in place in their advanced position. As such, the work supports 92 do not hydraulically advance the plunger 90. Rather, the work supports 92 constrain the plungers 90 from any axial movement. Likewise, the plungers 90 do not impart any force along their respective axes to the pads or the chassis frame 10. In this way, the chassis frame 10 is gently or passively immobilized, trapped, constrained, restricted, or restrained by the upper and lower pads 86 and 88 so that there is no gap or slack between the pads 86 and 88 and the chassis frame 10. In contrast, the chassis frame 10 is not forcibly or actively clamped, clenched, or gripped by the upper and lower pads 86 and 88.

After the chassis frame 10 is immobilized as described above, desired manufacturing operations, such as forming, piercing, or fastening, are then performed upon the chassis frame 10 to produce desired features, as described in the preferred embodiment. Once such operations have been completed, the work supports 92, and hence plungers 90, are unlocked by releasing the hydraulic pressure applied thereto. The threaded body cylinders 94 are actuated to advance their plungers 96 and thereby overcome the spring force of the work supports 92 and hence spread the upper and lower pads 86 and 88 apart. The immobilizing device 60 is then retracted so that the chassis frame 10 can be advanced out of the workstation.

While the present invention has been described in terms of a preferred embodiment, it is apparent that other forms could be adopted by one skilled in the art. Additionally, the verb "to locate" as used in describing the present invention is used in the passive sense. That is to say, it is used in the sense of finding or discovering the workpiece, and is not used in the sense of displacing the workpiece against a fixture.

Accordingly, the scope of the present invention is to be limited only by the following claims.

What is claimed is:

1. An apparatus for finding and immobilizing a workpiece in its free state so as to establish a net datum position of said workpiece, said apparatus comprising:

at least one pair of opposed pads;

means for advancing said at least one pair of opposed pads from a retracted position to an advanced position in contact with opposite portions of said workpiece so as to find said workpiece in its free state without measurably displacing said workpiece; and means for locking said at least one pair of opposed pads in said advanced position, whereby said at least one pair of opposed pads lock in place so as to immobilize said workpiece in its free state.

2. The apparatus as claimed in claim 1, further comprising:

means for unlocking said at least one pair of opposed pads so as to release said workpiece; and means for retracting said at least one pair of opposed pads from said advanced position to said retracted position clear of said workpiece.

3. The apparatus as claimed in claim 2, wherein said advancing means and said retracting means comprises:

a spring for biasing each pad of said at least one pair of opposed pads toward said retracted position; and means for pneumatically actuating each pad of said at least one pair of opposed pads toward said advanced position.

4. The apparatus as claimed in claim 3, wherein said locking means and said unlocking means comprise a hydraulic locking device associated with each pad of said at least one pair of opposed pads to lock each pad of said at least one pair of opposed pads in said advanced position.

5. The apparatus as claimed in claim 4, wherein said advancing means, said retracting means, said locking means, and said unlocking means comprise a work support device of the pneumatic-advance, hydraulic-lock, and spring-retract type.

6. The apparatus as claimed in claim 5, wherein:

each pad of said at least one pair of opposed pads comprises a workpiece contact side and a locking side opposite said workpiece contact side; and said advancing means and said retracting means comprise a pair of fluidic cylinder devices mounted between said at least one pair of opposed pads in contact with said workpiece contact sides of said at least one pair of opposed pads, and said locking and unlocking means comprise a pair of locking fluidic cylinder devices in contact with said locking sides of said at least one pair of said opposed pads.

7. An apparatus for finding and immobilizing a chassis frame in its free state, despite within-tolerance variations in size or location of said chassis frame, so as to establish a net datum position of said chassis frame to enable net datum features to be fabricated net to a fixture and in design-intent position on said chassis frame, said apparatus comprising:

a pair of opposed hydraulic units, each hydraulic unit of said pair of opposed hydraulic units being disposed on opposite sides of a portion of said chassis frame such that said portion of said chassis frame is between said pair of opposed hydraulic units, each hydraulic unit of said pair of opposed hydraulic units comprising:

a plunger mounted displaceably therein and terminating in a pad, said plunger being normally biased toward a retracted position clear of said chassis frame;

means for advancing said plunger from said retracted position to an advanced position, such that said pad contacts said chassis frame without measurably displacing said chassis frame; and means for locking said pad in said advanced position, so as to immobilize said chassis frame in its free state between said pair of opposed hydraulic units.

8. The apparatus as claimed in claim 7, further comprising:

a stationary support positioned on one side of said chassis frame, one hydraulic unit of said pair of opposed hydraulic units being mounted to said stationary support; and a movable support positioned opposite said stationary support on an other side of said chassis frame, the other hydraulic unit of said pair of opposed hydraulic units being mounted to said movable support.

9. The apparatus as claimed in claim 8, wherein said movable support moves between a home position and a work position, said home position being distal said chassis frame to permit said chassis frame to be loaded in position with respect to said apparatus, said work position being proximate said chassis frame to permit said pair of opposed hydraulic units to find and immobilize said chassis frame.

10. The apparatus as claimed in claim 9, wherein each hydraulic unit of said pair of opposed hydraulic units further includes a spring therein adapted to bias said pad toward said retracted position.

11. An apparatus for finding and immobilizing a chassis frame in its free state, despite tolerance variations in size or location of said chassis frame, so as to establish a net datum position of said chassis frame to enable net datum features to be fabricated net to a fixture and in design-intent position on said chassis frame, said apparatus comprising:

a pair of fixed platens comprising one platen and an opposite platen mounted opposite said one platen, said opposite being spaced a predetermined distance apart from and substantially parallel to said one platen;

a plurality of guide bars extending between said pair of fixed platens;

a pair of displaceable pads mounted about said plurality of guide bars between said pair of fixed platens, said pair of displaceable pads comprising one pad and an opposite pad mounted opposite said one pad, said opposite pad being mounted about said plurality of guide bars a spaced predetermined distance apart from and substantially parallel to said one pad, said pair of displaceable pads being displaceable from a retracted position distal from said chassis frame to an advanced position in contact with said chassis frame;

means for displacing said pair of displaceable pads, said displacing means being positioned between said pair of fixed platens, whereby said means for displacing displaces said pair of displaceable pads between said retracted position and said advanced position into contact with opposite reference surfaces on said chassis frame without measurably deforming said chassis frame so as to find said chassis frame in its free state; and means for locking said pair of displaceable pads, said locking means being positioned between said pair of fixed platens, whereby said means for locking locks said pair of displaceable pads in said advanced position so as to immobilize said chassis frame in said free state.

12. An apparatus as claimed in claim 11 further comprising a base structure adapted to support said pair of fixed platens, said base structure being displaceable between a home position distal said chassis frame and a work position proximate said chassis frame.

13. An apparatus as claimed in claim 12, wherein said locking means comprises a pair of work supports positioned between said pair of fixed platens, and said displacing means comprises said pair of work supports and a pair of threaded body cylinders positioned between said pair of displaceable pads.

14. An apparatus as claimed in claim 13, wherein said pair of work supports comprise hydraulic work supports and said pair of threaded body cylinders comprise hydraulic cylinders.

15. An apparatus as claimed in claim 13, wherein said pair of work supports comprise hydraulic work supports and said pair of threaded body cylinders comprise pneumatic cylinders.

* * * * *